US006673237B2

(12) United States Patent
Liu et al.

(10) Patent No.: US 6,673,237 B2
(45) Date of Patent: Jan. 6, 2004

(54) HIGH PERFORMANCE MONOLITH TREATER FOR GASOLINE UPGRADE

(75) Inventors: Wei Liu, Painted Post, NY (US); Tinghong Tao, Big Flats, NY (US)

(73) Assignee: Corning Incorporated, Corning, NY (US)

(*) Notice: Subject to any disclaimer, the term of this patent is extended or adjusted under 35 U.S.C. 154(b) by 38 days.

(21) Appl. No.: 09/996,499

(22) Filed: Nov. 28, 2001

(65) Prior Publication Data
US 2003/0102253 A1 Jun. 5, 2003

(51) Int. Cl.[7] .............................................. C10G 45/00
(52) U.S. Cl. ...................... 208/213; 208/67; 502/204; 502/313; 502/314; 502/315
(58) Field of Search .................. 208/213, 67; 502/204, 502/313, 314, 315

(56) References Cited

U.S. PATENT DOCUMENTS

| 4,771,029 | A |   | 9/1988  | Pereira et al. |
| 5,444,033 |   |   | 8/1995  | Usui et al. |
| 5,494,875 |   |   | 2/1996  | Usui et al. |
| 5,853,570 |   |   | 12/1998 | Hatanaka et al. |
| 5,906,730 |   |   | 5/1999  | Hatanaka et al. |
| 6,063,633 |   |   | 5/2000  | Willson, III |
| 6,086,749 |   |   | 7/2000  | Kramer et al. |
| 6,315,890 |   | * | 11/2001 | Ladwig et al. ............... 208/67 |

FOREIGN PATENT DOCUMENTS

WO          97/40120          10/1997

OTHER PUBLICATIONS

Hatanaka et al., "Hydrodesulfurization of Catalytic Cracked Gasoline. 1. Inhibiting Effects of Olefin on HDS of Alkyl-(benzo)thiophenes Contained in Catalytic Cracked Gasoline", Ind. Eng. Chem. Res. 1997, 36, p. 1519–1523.

Hatanaka et al., "Hydrodesulfurization of Catalytic Cracked Gasoline. 2. The Difference Between HDS Active Site and Olefin Hydrogenation Active Site", Ind. Eng. Chem. Res. 1997, 36, p. 5110–5117.

Hatanaka et al., "Hydrodesulfurization of Catalytic Cracked Gasoline. 3. Selective Catalytic Cracked Gasoline Hydrodesulfurization on the Co–Mo/γ–$Al_2O_3$ Catalyst Modified by Coking Pretreatment", Ind. Eng. Chem. Res. 1998, 37, p. 1748–1754.

* cited by examiner

Primary Examiner—Walter D. Griffin
Assistant Examiner—James Arnold, Jr.
(74) Attorney, Agent, or Firm—Kees van der Sterre

(57) ABSTRACT

A method of increasing the selective desulfurization of naphtha feed streams that includes: combining a naphtha feed stream with a hydrogen containing gas to form a combined feed stream and reacting the combined feed stream over a monolithic honeycomb catalyst bed containing hydrodesulfurization catalyst components to give a desulfurized naphtha. In conducting such an illustrative embodiment, the percent desulfurization of the naphtha is preferably greater than about 50% and the percent olefin hydrogenation of the naphtha is preferably less than about 50%. The monolithic honeycomb catalyst bed of one alternative and illustrative embodiment preferably has a channel density of about 25 to 1600 cells per square inch; a channel size from about 0.1 to 10 mm; and a channel wall thickness of about 0.01 to about 2.0 mm. The illustrative method should be carried out such that the octane number (R+M/2) of the naphtha feed stream is reduced by no more than 3.0 at 95% desulfurization and preferably no more than 1.5. The hydrodesulfurization catalyst components include a powdered refractory oxide and transition metal catalyst compounds. Alternatively the hydrodesulfurization catalyst components may be impregnated into the monolithic honeycomb catalyst bed itself. Preferable hydrodesulfurization catalyst components include a Group VIII metal containing compound and a Group VIB metal containing compound. Alternatively the hydrodesulfurization catalyst components may further include a phosphorous promoter.

19 Claims, 1 Drawing Sheet

HIGH PERFORMANCE MONOLITH TREATER FOR GASOLINE UPGRADE

BACKGROUND OF THE INVENTION

The hydrotreating process is a dominant process technology in refineries for fuel upgrading and clean-up. The hydrotreating reaction can be classified into four categories: hydrodesulfurization (HDS), hydrodenitrogenation (HDN), hydrodemetallation (HDM), and hydrodeoxygenation (HDO). In many cases, these reactions proceed simultaneously inside the reactor. Among them, HDS is of primary importance. The HDS reaction involves the breakage of carbon-sulfur bonds by addition of hydrogen molecules so as to release sulfur as $H_2S$ gas. The carbon-sulfur bonds often exist inside an aromatic molecular structure, requiring the HDS reaction to be concomitant with aromatic saturation.

Current commercial HDS technology is mature and is based on cobalt/molybdenum impregnated gamma-alumina or on nickel/molybdenum impregnated catalysts. These catalysts are employed in large reactors as random packed beds of spherical, cylindrical, or shaped extrudate beads. HDS reactors typically operate in a trickle-bed mode wherein the raw, high sulfur-containing distillate-range hydrocarbon liquid flows at relatively low velocity downward through the catalyst bed, while a hydrogen-rich gas flows co-currently downward through the catalyst at a much higher velocity. Organic sulfur compounds and organic nitrogen compounds in the distillate are converted to hydrogen sulfide and ammonia, which are separated from the treated liquid product downstream in the vapor/liquid separator and in a stripper distillation tower. The sour gas is often treated by amine absorption to remove the $H_2S$ and $NH_3$, with the large excess of hydrogen containing gas recycled back to the process. The recycle gas rate is typically adjusted so as to provide an excess of hydrogen over the stoichiometric requirements for reaction. This results in the hydrogenation of olefins and other desirable compounds that may be present in the hydrocarbon feed or generated during the hydrotreating process.

Cracked naphtha is a blending component commonly used in refinery gasoline pools. Cracked naphtha can be produced in refinery fluid catalytic cracking processes, coking processes, or hydrocracking processes, among others, where a gasoline boiling range component is generated or distilled having olefinic compounds. Cracked naphtha typically contains both sulfur and olefin compounds. The sulfur compounds, which can be present in cracked naphtha in amounts ranging up to 1.0 percent by weight, are potential air pollutants and a poison to the catalysts used in automobile catalytic converters. Thus it is desirable to remove the sulfur compounds from the cracked naphtha. However, desirable olefin compounds can be present in cracked naphtha in an amount ranging up to 60 percent by weight. The olefin compounds are desirable because they have octane numbers that are generally higher than the octane numbers of their corresponding saturates. Thus, it is generally undesirable to saturate olefins to saturates wherein the component stream is to be blended directly to gasoline. If the cracked naphtha is to be desulfurized without eliminating or seriously reducing the olefin content, the hydrodesulfurization process needs to be very selective. That is to say the hydrodesulfurization process should remove substantially all of the sulfur compounds without severely saturating the olefins that are present.

Currently, there are several hydrotreating catalysts and processes that find considerable use in the petroleum refining industry. Such hydrotreating catalysts include a variety of transition metals such as cobalt and molybdenum and their compounds on a suitable support, cobalt, molybdenum, and nickel on a suitable support, nickel and tungsten and compounds thereof on a suitable support, and nickel and molybdenum and compounds thereof on a suitable support. The support, in general, is a weakly-acidic catalytically active alumina. Typically the alumina support is in pellet form and formed as extrudate of a slurry of alumina powder. These extruded alumina pellets are then impregnated with solutions containing precursors and then calcined and sulfided prior to use. Such conventional hydrodesulfurization catalysts are less selective and not only remove sulfur from the petroleum hydrocarbon stream being treated, but also tend to saturate olefins, reducing the octane of the petroleum hydrocarbon stream.

Research over the last couple of decades has resulted in a great many hydrodesulfurization catalysts and processes for desulfurizing naphtha feed streams, while attempting to keep olefin saturation at a minimum. While there are commercially successful naphtha hydrodesulfurization catalysts in use today, there is a continuing need for improved catalysts, methods and reactors that are capable of combining optimum hydrodesulfurization with minimum hydrogenation of olefin.

SUMMARY OF THE INVENTION

The present invention includes a process for the hydrotreating of a hydrocarbon feed. Such an illustrative process includes reacting the hydrocarbon feed and a hydrogen containing gas in a reactor containing a monolithic honeycomb catalyst bed to give a hydrotreated hydrocarbon product. The monolithic honeycomb catalyst bed is formulated to include a monolithic honeycomb refractory support and a suitable hydrotreating catalyst. In carrying out the illustrative process, the hydrogen containing gas to hydrocarbon feed liquid volume ratio is preferably greater than about 10 NL/L, the liquid hourly space velocity is preferably greater than about 1 liter feed per hour per liter of catalyst bed volume, the reactor pressure is preferably greater than about 50 psig, and the monolithic honeycomb catalyst bed temperature is preferably greater than about 50° C. In one illustrative embodiment, the physical feature of the monolithic honeycomb catalyst bed are such that it has a channel density of about 25 to 1600 cells per square inch; a channel size from about 0.1 to 10 mm; and a channel wall thickness of about 0.01 to about 2.0 mm.

The hydrotreating catalyst components include a powdered refractory oxide and transition metal catalyst compounds or alternatively the hydrotreating catalyst components are impregnated into the monolithic honeycomb refractory support itself. Preferably the hydrotreating catalyst components include a Group VIII metal containing compound and the Group VIB metal containing compound. In one illustrative embodiment, the Group VIII metal is cobalt and the Group VIB metal is molybdenum. When the Group VIB metal is molybdenum, the molybdenum content of the hydrotreating catalyst components measured as weight percent of $MoO_3$ is preferably from about 12 to about 18. Similarly when the Group VIII metal is cobalt, the cobalt content of the hydrotreating catalyst components measured as weight percent of $Co_3O_4$ is preferably from about 2 to about 5. In addition to catalytic transition metal components, and alternative illustrative embodiment of the hydrotreating catalyst components may also include a phosphorous promoter. In such instances the phosphorous promoter content measured as weight percent of $P_2O_4$ is preferably from about 0.1 to about 2. Irrespective of the method of formulating the monolithic honeycomb catalyst bed, the hydrotreating catalyst components are preferably from about 1 weight percent to about 100 weight percent of the monolithic honeycomb catalyst bed. One illustrative and preferred embodiment of the present invention involves the hydrodesulfurization of cracked naphtha.

The present invention also encompasses a reactor for the hydrotreating of hydrocarbon feedstocks. Such hydrocarbon feedstocks include for example, naphtha fractions, heavy cracked naphtha, and other similar hydrocarbon feeds in which hydrotreating is desired. One illustrative embodiment of the reactor includes a reaction chamber having a feed inlet and a product outlet; and a monolithic honeycomb catalyst bed inside the reaction chamber. The monolithic honeycomb catalyst bed may be composed of one or more modules that are composed of a monolithic honeycomb refractory support and a hydrotreating catalyst component.

BRIEF DESCRIPTION OF THE DRAWINGS

The invention may be further understood by reference to the drawings, wherein.

DESCRIPTION OF ILLUSTRATIVE EMBODIMENTS

Figure 1:
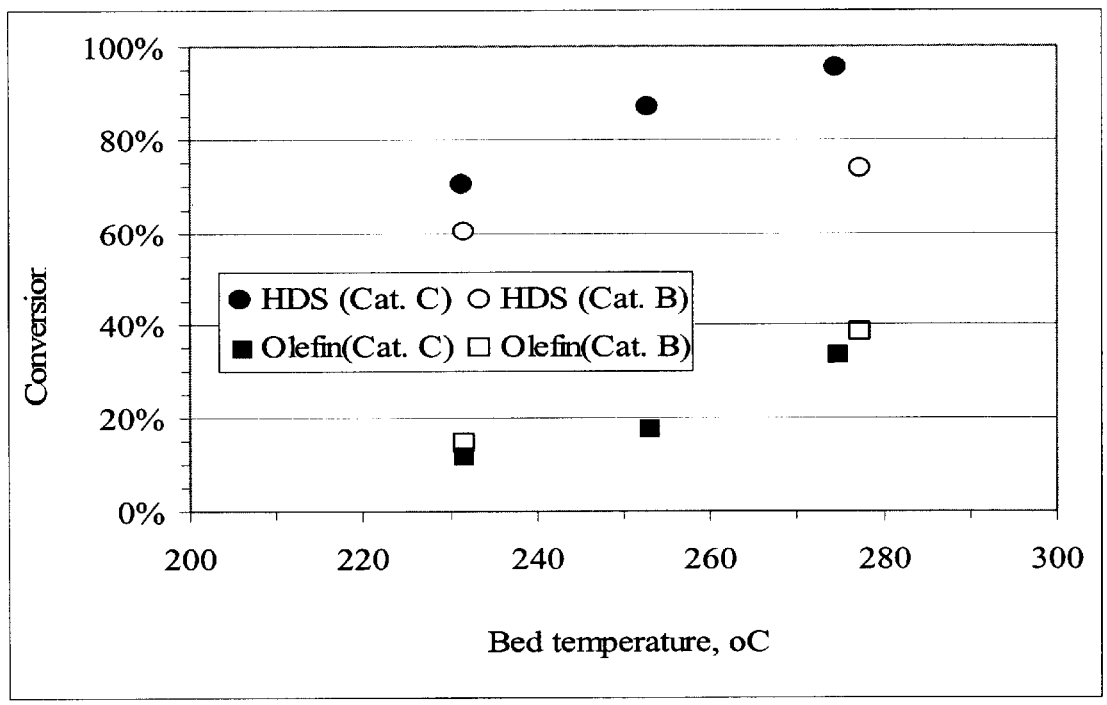
FIG. 1 graphically illustrates representative data of the hydrodesulfurization percent conversion and the olefin conversions for two illustrative monolith catalysts, Catalyst B and Catalyst C at various reactor bed temperatures.

The present invention is generally directed to a process for the hydrotreating of hydrocarbon feedstocks. Such hydrocarbon feedstocks include for example, naphtha fractions, heavy cracked naphtha, and other similar hydrocarbon feeds in which hydrotreating is desired. Such an illustrative process includes reacting the hydrocarbon feed and a hydrogen containing gas in a reactor containing a monolithic honeycomb catalyst bed to give a hydrotreated hydrocarbon product. Depending upon the hydrocarbon feed and the reactor conditions (i.e. temperature, pressure, feed rate, etc. . . . ) required for specific conversion economics, the reaction of the present invention may be a two phase reaction (i.e. gas reactants over a solid catalyst) or the reaction may be a three phase reaction (i.e. a mixture of gas and liquid reactants over a solid catalyst). In one preferred embodiment utilizing cracked naphtha as the hydrocarbon, the reactions of the present inventive process are substantially two phase reactions. The hydrogen containing gas used in the processes of the present invention include any useful mixture of hydrogen with other inert gases that do not interfere with the hydrotreating reaction.

The monolithic honeycomb catalyst bed is formulated to include a monolithic honeycomb refractory support and a suitable hydrotreating catalyst. In one illustrative embodiment of the present invention, the monolithic honeycomb catalyst bed is composed of individual blocks of honeycomb monolith stacked end to end so as to form long tubular channels in the reactor. Alternatively, multiple blocks of monolithic honeycomb can be arraigned in an array such that all of the channels of the monolithic honeycomb are substantially parallel to each other. Thus in a commercial scale reactor, multiple blocks would be set into an array to form a first monolithic honeycomb catalyst bed layer and then additional layers added in sequence.

One illustrative embodiment of the current invention is a reactor using monolithic catalyst beds for hydrotreating hydrocarbons. Such a reactor includes: at least two monolithic catalyst beds in series, wherein each catalyst bed has an inlet end and a outlet end and a direction of flow from the inlet end to the outlet end. Preferably the direction of flow is substantially parallel to the axial alignment of the channels of the monolithic catalyst bed. The reactor may include hydrogen containing gas injectors between each of the monolithic honeycomb catalyst bed layers, and those of ordinary skill in the art will appreciate that many other conventional components useful for the operation of the reactor may also be employed. Such components will include a suitably sized reaction containment vessel; pumps, valves, pipes and control means for feeding the reactor and removing the desired product; and temperature, pressure and safety and reaction monitoring controls and electronics used to control and operate the reactor safely. Such additional equipment and apparatus will be apparent to those of ordinary skill in the art of reactor design and chemical engineering.

The monolithic honeycomb refractory support itself is composed of walls made of porous materials suitable as catalyst supports, such as alumina, alumina-silica, cordierite, or the like. The channel geometry of the honeycomb catalyst support may be polygonal in nature. In one illustrative embodiment the channels have a profile that is hexagonal alternatively square. The density of cells within the monolithic honeycomb refractory support is generally measured in cells per square inch of surface area. The cell density may be varied throughout a wide range preferably from about 25 to about 1600 cells per square inch (cpsi) and more preferably about 400 cpsi. In one preferred embodiment the walls of the monolithic honeycomb refractory supports are made of alumina or alumina-silicate and have an average pore size from 2 $\mu$m to 1000 $\mu$m with BET surface areas in the range of about 10 to about 400 m$^2$/g. Where a wall material of alumina is used as a substrate for an applied catalyst, gamma-alumina honeycomb substrates are preferred. Alternatively monolithic honeycomb refractory support formed of other durable materials such as cordierite (a magnesium aluminosilicate) can be provided with a coating of alumina. Alternatively, the cordierite monolithic honeycomb refractory supports can be wash coated with impregnated particulate catalyst in a manner that one of skill in the art should know and understand. U.S. Pat. No. 4,771,029 describes one such method of "washcoating" a honeycomb catalyst support with a catalyst agent. The contents of U.S. Pat. No. 4,771,029 are hereby incorporated in its entirety by reference. In that reference, a monolith is washcoated with catalyst particles to treat automotive exhaust gases, however, the same or similar methods of washcoating can be used to washcoat catalyst particles onto monolithic honeycomb refractory supports of the present invention. In such instances, the monolithic honeycomb refractory support serves as a relatively inert carrier for the particulate catalyst. Alternatively, the monolithic honeycomb refractory support itself can be the active catalyst impregnated with the hydrotreating catalyst and inert particles can be washcoated onto the monolithic honeycomb refractory support. Yet another alternative embodiment is to first washcoat the monolithic honeycomb refractory support with alumina or alumina-silica particles and then impregnate the washcoated monolithic honeycomb refractory support. Regardless of the method used to achieve the final monolithic honeycomb catalyst bed or the blocks of monolith that make up the final monolithic honeycomb catalyst bed, the catalytic activity of the hydrotreating catalyst can be carefully controlled and adjusted systematically to optimize the catalyst formulation.

In one illustrative and preferred embodiment of the present invention, the catalytic components of the monolithic honeycomb catalyst bed are impregnated into the monolithic honeycomb refractory support by any suitable conventional means. For example, an impregnating solution containing Group VIB and VIII metal salts that decompose upon heating is formulated and then the monolithic honeycomb refractory support is immersed in the impregnating solution. Other methods known to one of ordinary skill in the art may also be used, such as ion exchange methods for incorporating the precursor materials into the monolith, and so forth.

Another illustrative and preferred embodiment utilizes a suitable catalyst support in powder form that has been impregnated with a solution containing Group VIB and VIII metal salts that decompose upon heating for an appropriate time period. The impregnated powder is then washcoated onto the surface of the monolithic honeycomb refractory support as previously noted above.

Suitable impregnation solutions include aqueous solutions containing Group VIB and VIII transition metal salts that decompose upon heating. For example suitable salts include cobalt nitrate, ammonium molybdate, nickel nitrate and ammonium meta-tungstate. Thus, conventional hydrodesulfurization catalysts such as, Co, Ni, Mo, and W, alone or in combination with other catalyst additives and promoters such as phosphorus can be used. Conventional catalyst loadings may be used with metal catalyst concentrations, measured as the final metal oxide content, in the range of 2 to 30 weight percent based on weight. Variations of concentration, particle size, porosity, surface area, the presence or absence of promoter elements, and so forth may be made systematically to achieve the optimum conditions for impregnation.

Once the monolithic honeycomb refractory support has been either impregnated itself or washcoated, the monolith is heated or calcined to decompose the metal salts present to form metal oxide compounds that serve as stable precursors of the final catalyst. Calcination is generally carried out in air at a temperature from about 120° C. to about 650° C. and preferably from about 200 to 500° C.

As indicated in the examples below, prior to use in the processes of the present invention, the monolithic honeycomb catalyst bed may need to be activated or otherwise treated in situ before achieving full activity. In the case of hydrodesulfurization monolithic honeycomb catalyst bed, such as those in the examples, the monolithic honeycomb catalyst bed must be sulfided to form the fully active catalyst. Such pre-activation steps and processes are well known in the art for a wide variety of hydrotreating catalysts.

Compared with a catalyst bed packed with catalyst pellets, monolithic honeycomb catalyst beds utilized in the present invention presents many distinct advantages. For example, the void fraction of a monolith catalyst bed is highly tunable by changing the ratio of wall thickness to channel opening. Thus, for a given catalyst bed volume or the liquid hourly space velocity (LHSV), catalyst loading of a monolith reactor can be adjusted by changing geometric cell parameters, whereas LHSV in a conventional packed bed reactor generally has little room for variation.

Monolithic honeycomb catalyst beds used in the present invention also obtain advantage from the fact that at least two of the variables from among the group of available geometric variables of the catalyst (wall thickness, channel opening, void fraction and cell density) may be independently varied. Thus, wall thickness and void fraction can be independently adjusted, with some advantages being derived from void fraction adjustments and other advantages being derived from catalyst wall thickness adjustments. For example, during the hydrodesulfurization reaction process, hydrogen and hydrocarbon reactant must diffuse into the macro/meso/micro pores of the catalyst to react, while reaction products such as $H_2S$ need to diffuse out of the pores. Thus thinner catalyst walls could have an advantage if the catalyst were sufficiently concentrated or active.

In addition to the above properties, the activity and heat transfer properties of the monolithic honeycomb catalyst bed can be carefully and systematically adjusted so as to achieve previously unobtainable results. As demonstrated in the examples below, in the hydrodesulfurization of cracked naphtha the octane values of the hydrocarbon product (as measure by the R+M/2 method) is reduced by no more than 3.0 and preferably is reduced by less than 1.5. Even more remarkably, the octane number actually increases under certain conditions of hydrodesulfurization. One of skill in the art should appreciate the significance of achieving such results.

The general reactor conditions under which the methods of the present invention are carried out are similar to those known for naphtha hydrotreating reactions. Depending upon the hydrocarbon feed and the reactor conditions (i.e. temperature, pressure, feed rate, etc. . . . ) required for specific conversion economics, the reaction of the present invention may be a two phase reaction (i.e. gas reactants over a solid catalyst) or the reaction may be a three phase reaction (i.e. a mixture of gas and liquid reactants over a solid catalyst). In one preferred embodiment utilizing cracked naphtha as the hydrocarbon, the reactions of the present inventive process are substantially two phase reactions.

One set of illustrative process conditions for carrying out HDS reactions in honeycomb catalysts in accordance with the invention includes a feed hydrogen gas to liquid feed volume ratio of about 10 to about 2000 NL/L, preferably about 50 to about 300 NL/L. Reaction temperatures maintained in catalyst beds of the present invention should be greater than about 50° C. and may range from about 200° to about 500° C., preferably about 250° to about 400° C. Reactor pressure should be greater than about 50 pounds per square inch (gauge) (psig) and may range from about 100 to about 2000 psig, preferably in the range of about 150 to about 1000 psig. Liquid hourly space velocity (LHSV) values for the reactors of the present invention are typically higher than those utilized in conventional hydrotreating reactors. Thus the LHSV can be from about 0.1 to about 500 liters per liter per hour, but preferably are greater than 1 liter per liter per hour and more preferably about 2 to about 50 liters per liter per hour can be used. Superficial liquid linear velocities for the purpose of the present description may be calculated in the conventional manner by dividing the liquid feed flow rate through the reactor at normal conditions (1 atm, 20° C.) with the cross-sectional area of the monolith reactor. Such calculations are within the routine skill of one in the art. In carrying out the present invention, superficial liquid linear velocities are typically greater than about 0.2 cm/s.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention. Unless otherwise stated, all starting materials are commercially available and standard laboratory techniques and equipment were utilized.

Monolith Catalyst of Low Metal Loading (Cat. B)

A 30 cm long×1 cm diameter section of gamma-alumina monolith was utilized as the support for the catalyst. The monolith support had a cell density of 400 cells per square inch (cpsi) and cell wall thickness of 7 mm. The monolith support was impregnated with the catalytic metal precursor solutions using the co-impregnation method. Sufficient impregnation solution was prepared so that the entire monolith support was immersed in impregnation solution for at least 15 minutes and then the solution was removed by vacuum. The channels of the monolith were freed of solution using a stream of compressed dry air. The impregnation solution itself was prepared by dissolving 8.590 g. of citric acid in 15 ml of deionized water to which 2.840 g. of cobalt carbonate was added. The resulting solution was heated to a boil then held there until the solution was clear. The heated solution was then cooled to about room temperature and 6.533 g. of ammonium heptamolybdate was added. After the solution became clear, the solution was diluted to 73.3 ml with deionized water.

The impregnated monolith was dried overnight in a fume hood and then transferred to an oven for drying and calcination in air. The calcination furnace temperature was ramped from room temperature to 49° C. at 1° C./minute. Once the temperature stabilized, the furnace temperature was held at 49° C. for 4 hours. The temperature was then ramped from 49° C. to 460° C. at 5° C./minute. Once stabilized, the furnace temperature was held at 460° C. for 2 hours. The furnace was then turned off and allowed to cool to room temperature. Upon completion of the calcination process, the impregnated and calcined monolith appeared uniformly blue in color along the length and across the channels. The catalytic metal analysis and surface properties of the impregnated and calcined monolith are given below:

| Catalyst B | |
|---|---|
| Catalytic Metal Analysis | |
| $MoO_3$ | 5.48 wt. % |
| $Co_3O_4$ | 1.6 wt. % |
| Surface Properties | |
| BET surface area | 228 $m^2/g$ |
| Pore Volume | 0.5867 $cm^2/g$ |
| Pore Size | $7.8 \times 10^{-9}$ m |

Elemental analysis was conducted on a Perkin Elmer Optimum 3000 apparatus with standard ICP/DCP method coming with the apparatus by using Corning's "General Procedure for flask fusion sample dissolution #410023-000" for sample preparation.

The above surface properties were measured on a Quantachrome Autosorb-1-MP with nitrogen adsorption. The methods utilized in the determinations were ASTM D4567-99 Standard Test Method for Single-Point Determination of Specific Surface Area of Catalysts and Catalyst Carriers Using Nitrogen Adsorption by Continuous Flow Method and ASTM D4641-94 Standard Practice for Calculation of Pore Size Distributions of Catalysts from Nitrogen Desorption Isotherms the contents of which are incorporated herein by reference. The samples were outgassed using vacuum at 300° C. for a minimum of 3 hours unless otherwise stated before the adsorption measurement.

Monolith Catalyst of High Metal Loading (Cat. C)

A 30 cm long×1 cm diameter section of gamma-alumina monolith was utilized as the support for the catalyst. The monolith support had a cell density of 400 cells per square inch (cpsi) and cell wall thickness of 7 mm. The monolith support was impregnated with the catalytic metal precursor solutions using a sequential impregnation method. First impregnation was conducted with a solution made of 215.4 g of ammonium heptamolybdate tetrahydrate, 2.145 ml of 85% phosphoric acid solution, and 500 ml of de-ionized water. The monolith was immersed in the impregnation solution and allowed to soak for at least 15 minutes. The impregnation solution was then removed using vacuum and excessive liquid was blown out of the monolith channels with a stream of dry clean air. The wetted monolith was air-dried. The impregnated monolith was then calcined in static air by using the following temperature profile: room temperature to 120° C. at 1° C./min, 120° C. for 2 h, 120° C. to 500° C. at 1° C./min, 500° C. for 1 h then cool to room temperature. For the second step of the sequential impregnation a second impregnation solution was used made from 143.623 g of cobalt nitrate hexahydrate was dissolved in 500 ml of deionized water. The MoP-impregnated monolith was wetted by using 200 ml of the cobalt nitrate solution. The soaking and vacuum procedures were the same as the first step. The impregnated monolith was dried and calcined identically to the first step procedures. Upon completion of the calcination process, the impregnated and calcined monolith appeared uniform in color along the length and across the channels. The catalytic metal analysis and surface properties of the impregnated and calcined monolith are given below:

| Catalyst C | |
|---|---|
| Catalytic Metal Analysis | |
| $MoO_3$ | 16.6 wt. % |
| $Co_3O_4$ | 3.5 wt. % |
| $P_2O_4$ | 0.71 wt. % |
| Surface Properties | |
| BET surface area | 200 $m^2/g$ |
| Pore Volume | 0.50 $cm^2/g$ |
| Pore Size | $6.5 \times 10^{-9}$ m |

Elemental analysis was conducted on a Perkin Elmer Optimum 3000 apparatus with standard ICP/DCP method coming with the apparatus by using Corning's "General Procedure for flask fusion sample dissolution #410023-000" for sample preparation.

The above surface properties were measured on a Quantachrome Autosorb-1-MP with nitrogen adsorption. The methods utilized in the determinations were ASTM D4567-99 Standard Test Method for Single-Point Determination of Specific Surface Area of Catalysts and Catalyst Carriers Using Nitrogen Adsorption by Continuous Flow Method and ASTM D4641-94 Standard Practice for Calculation of Pore Size Distributions of Catalysts from Nitrogen Desorption Isotherms the contents of which are incorporated herein by reference. The samples were outgassed using vacuum at 300° C. for a minimum of 3 hours unless otherwise stated before the adsorption measurement.

Selective Hydrodesulfurization of Full-Range Cracked Naphtha Feed Over Structured Honeycomb Catalyst Bed A honeycomb catalyst reactor bed was made by stacking three pieces of 30 cm, 400 cpsi (7 mil) monolith catalysts lengthwise to form a 90 cm-long catalyst bed. The catalyst bed module was loaded inside a tube reactor with the void space being filled by inert silicon carbide particles. The reactor system was pressure tested and purged by inert nitrogen. The reactor was configured such that the hydrogen feed gas and liquid were introduced from top of the catalyst bed and flowed through the catalyst bed downwardly.

The CoMo/alumina catalyst was sulfided in-situ using 100 Nl/h of a 3% $H_2S/H_2$ gas mixture at a constant pressure of 25 bar. The temperature of the reactor was increased to temperatures of 95° C., 200° C., and 280° C. by 30° C./h, maintaining each temperatures for 6 hours, then, to 375° C. by 30° C./h and maintaining for 2 hours. The sulfiding process converts the metal oxide into the metal sulfide that comprises the active catalyst phase.

After the sulfiding, the reactor was adjusted to the target reaction conditions. The feeds were provided to establish a liquid-hourly-space-velocity 4.1 $h^{-1}$, a hydrogen gas feed volume to cracked naphtha feed volume ratio of 350 Nl/l, and a pressure of 180 pounds/$in^2$ (gauge). The catalytic cracked naphtha feed and hydrogen gas were introduced after the temperature was stabilized at the target reaction temperature.

Table 1 below lists properties of a full-range catalytic cracked naphtha feed used in this example.

TABLE 1

| | |
|---|---|
| Total sulfur by XRF, wppm | 792 |
| Nitrogen, wppm | 25.7 |
| Carbon, wt. % | 85.8 |
| Hydrogen, wt. % | 13.7 |
| Bromine number, g $Br_2$/100 g | 51.7 |
| Diene number | 1.3 |
| Octane number (Research) | 92.5 |
| Octane Number (Motor) | 81.3 |
| RM/2 | 86.9 |
| Density, g/ml | 0.751 |
| D86 Distillation, ° C. | |
| Initial Boiling Point | 30 |
| 5 | 51 |
| 95 | 194 |
| Final Boiling Point | 210 |

Fractions of the reaction product were taken and analysis conducted. Data representative of the reaction conditions and product characteristics for both Catalyst B and Catalyst C are provided below in Tables 2 and 3 respectively.

TABLE 2

Reaction Conditions & Product Characteristics (Catalyst B)

| | Reaction condition | | | | Conversion | | | |
|---|---|---|---|---|---|---|---|---|
| Run | LHSV[a] (l/h) | P (psig) | $T_{AVG}$[b] (° C.) | $H_2$/Oil (nl/l) | HDS (wt %) | Olefin[c] (wt %) | HDN (wt %) | Density (g/ml) |
| 1B | 3.8 | 199 | 232 | 365 | 60.1 | 14.7 | 1.9 | 0.7478 |
| 2B | 3.8 | 198 | 277 | 366 | 73.5 | 38.6 | 27.6 | 0.7452 |
| 3B | 7.9 | 197 | 274 | 351 | 68.8 | 26.3 | 12.9 | 0.7463 |
| 4B | 7.6 | 314 | 275 | 367 | 77.7 | 30.5 | 21.2 | 0.7453 |
| 5B | 7.9 | 201 | 152 | 88 | 13.4 | 2.5 | −5.6 | 0.7468 |
| 6B | 15.6 | 203 | 153 | 89 | −0.7 | 1.5 | −3.0 | 0.7470 |
| 7B | 7.8 | 184 | 275 | 357 | 67.3 | 26.4 | 12.6 | 0.7472 |

[a]LHSV is calculated based on reactor volume, i.e., total volume of catalyst bed.
[b]Temperature is an average of top and bottom bed temperature.
[c]Olefin conversion is calculated based on Bromine number loss.

TABLE 3

Reaction Conditions & Product Characteristics (Catalyst C)

| | Reaction condition | | | | Conversion | | | Octane | |
|---|---|---|---|---|---|---|---|---|---|
| RUN | LHSV[a] (l/h) | P (psig) | $T_{AVG}$[b] (° C.) | $H_2$/Oil (nl/l) | HDS (wt. %) | Olefin[c] (%) | HDN (wt. %) | R + M/2 loss | Density (g/ml) |
| 1C | 4.03 | 182 | 231 | 357 | 70.4 | 12.2 | 5.0 | | 0.7478 |
| 2C | 3.99 | 177 | 253 | 360 | 87.2 | 17.9 | 16.5 | | 0.7452 |
| 3C | 3.99 | 174 | 274 | 362 | 95.4 | 33.9 | 30.5 | −1.25 | 0.7463 |
| 4C | 4.13 | 172 | 231 | 175 | 58.5 | 5.3 | −3.4 | 0.35 | 0.7453 |
| 5C | 4.00 | 175 | 275 | 180 | 91.6 | 25.8 | 30.9 | −0.90 | 0.7468 |
| 6C | 8.07 | 175 | 204 | 90 | 36.4 | 3.4 | −3.9 | | 0.7470 |
| 7C | 7.98 | 168 | 236 | 90 | 50.5 | 7.1 | 1.2 | | 0.7472 |

[a]LHSV is calculated based on reactor volume, i.e., total volume of catalyst bed.
[b]Temperature is an average of top and bottom bed temperature.
[c]Olefin conversion is calculated based on Bromine number loss.

FIG. 1 graphically illustrates the above representative data of the hydrodesulfurization percent conversion and the olefin conversions over the two different monolith catalysts, Catalyst B (Cat. B) and Catalyst C (Cat. C) at various reactor temperatures.

One of skill in the art would appreciate that octane number is directly related to the olefin content. Thus, higher hydrodesulfurization conversion and lower olefin conversion is desired for gasoline desulfurization. Upon review of the performance of the Cat. B catalyst formulation a lower level of HDS activity is achieved when compared to that of Cat. C. Using Cat. B. 60% to 75% desulfurization was obtained under the reactor conditions. In contrast the performance of Cat. C catalyst formulation gives much higher HDS conversions than Cat. B at the similar olefin saturation level under the same reaction conditions.

Figure 2:
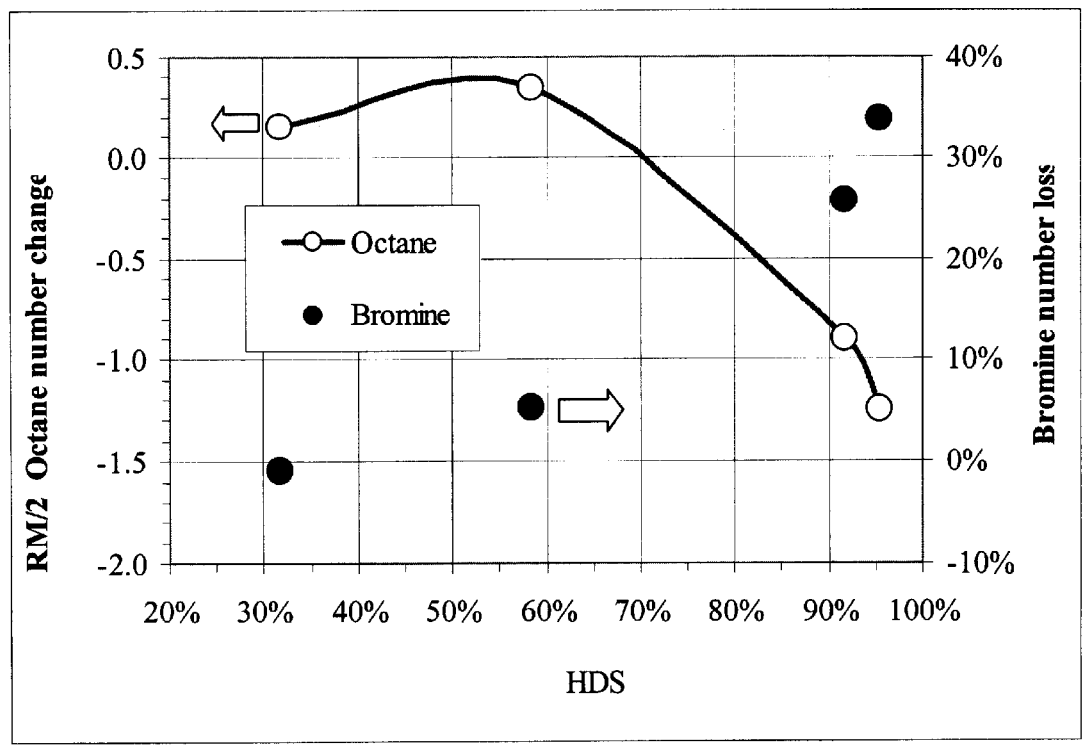
FIG. 2 graphically illustrates representative data of the octane number loss at different hydrodesulfurization levels for Catalyst C.

FIG. 2 graphically illustrates representative data of the octane number loss at different HDS levels from Table 3. Upon review of the data, one of skill in the art should appreciate that approximately 95% sulfur removal is achieved over the Cat. C formulation. This high level of desulfurization was obtained with an octane number loss of only 1.2. One of skill in the art should understand and appreciate that the present results demonstrate advantages and benefits that may be achieved by the unique geometry of the monolith reactor without the need to resort to radical variations of the catalyst composition. One of skill in the art should also appreciate from the above example and representative data that the octane number of the product naphtha can be increased using Cat. C at moderate HDS levels (~50%).

In view of the above, one of skill in the art should understand and appreciate that one illustrative embodiment of the present invention includes a process for the hydrotreating of a hydrocarbon feed. Such an illustrative process includes reacting the hydrocarbon feed and a hydrogen containing gas in a reactor containing a monolithic honeycomb catalyst bed to give a hydrotreated hydrocarbon product. The monolithic honeycomb catalyst bed is formulated to include a monolithic honeycomb refractory support and a suitable hydrotreating catalyst. In carrying out the illustrative process, the hydrogen containing gas to hydrocarbon feed liquid volume ratio is preferably greater than about 10 NL/L, the liquid hourly space velocity is preferably greater than about 1 liter per liter per hour, the reactor pressure is preferably greater than about 50 psig, and the monolithic honeycomb catalyst bed temperature is preferably greater than about 50° C. In one illustrative embodiment, the physical feature of the monolithic honeycomb catalyst bed are such that it has a channel density of about 25 to 1600 cells per square inch; a channel size from about 0.1 to 10 mm; and a channel wall thickness of about 0.01 to about 2.0 mm. The hydrotreating catalyst components include a powdered refractory oxide and transition metal catalyst compounds or alternatively the hydrotreating catalyst components are impregnated into the monolithic honeycomb refractory support itself. Preferably the hydrotreating catalyst components include a Group VIII metal containing compound and the Group VIB metal containing compound. In one illustrative embodiment, the Group VIII metal is cobalt and the Group VIB metal is molybdenum. When the Group VIB metal is molybdenum, the molybdenum content of the hydrotreating catalyst components measured as weight percent of $MoO_3$ is preferably from about 12 to about 18. Similarly when the Group VIII metal is cobalt, the cobalt content of the hydrotreating catalyst components measured as weight percent of $Co_3O_4$ is preferably from about 2 to about 5. In addition to catalytic transition metal components, and alternative illustrative embodiment of the hydrotreating catalyst components may also include a phosphorous promoter. In such instances the phosphorous promoter content measured as weight percent of $P_2O_4$ is preferably from about 0.1 to about 2. Irrespective of the method of formulating the monolithic honeycomb catalyst bed, the hydrotreating catalyst components are preferably from about 1 weight percent to about 100 weight percent of the monolithic honeycomb catalyst bed.

Alternatively, one of skill in the art should understand and appreciate that the present invention includes a method of increasing the selective desulfurization of naphtha feed streams. Such an illustrative embodiment includes a method including combining a naphtha feed stream with a hydrogen containing gas to form a combined feed stream and reacting the combined feed stream over a monolithic honeycomb catalyst bed containing hydrodesulfurization catalyst components to give a desulfurized naphtha. In conducting such an illustrative embodiment, the percent desulfurization of the naphtha is preferably greater than about 50% and the percent olefin hydrogenation of the naphtha is preferably less than about 50%. The monolithic honeycomb catalyst bed of one alternative and illustrative embodiment preferably has a channel density of about 25 to 1600 cells per square inch; a channel size from about 0.1 to 10 mm; and a channel wall thickness of about 0.01 to about 2.0 mm. The illustrative method should be carried out such that the octane number (R+M/2) of the naphtha feed stream is reduced by no more than 3.0 and preferably no more than 1.5. Illustrative process conditions include a feed hydrogen gas to liquid feed volume ratio from about 50 to about 5000 nl/l, a liquid hourly space velocity greater than about 1 liter per hour, a reactor pressure greater than about 50 psig, and a monolithic honeycomb catalyst bed temperature greater than about 50° C. The hydrodesulfurization catalyst components of one illustrative embodiment include a powdered refractory oxide and transition metal catalyst compounds. Alternatively these hydrodesulfurization catalyst components may be impregnated into the monolithic honeycomb catalyst bed itself. Preferable hydrodesulfurization catalyst components include a Group VIII metal containing compound and a Group VIB metal containing compound. Alternatively the hydrodesulfurization catalyst components may further include a phosphorous promoter. In one such illustrative embodiment, the Group VIII metal is preferably cobalt and the Group VIB metal is preferably molybdenum. When the Group VIB metal is molybdenum, the molybdenum content of the hydrodesulfurization catalyst components measured as weight percent of $MoO_3$ is preferably from about 12 to about 18. Similarly when the Group VIII metal is cobalt, the cobalt content of the hydrodesulfurization catalyst components measured as weight percent of $Co_3O_4$ is preferably from about 2 to about 5. Irrespective of the method of formulating the monolithic honeycomb catalyst bed, the hydrodesulfurization catalyst components are preferably from about 1 weight percent to about 100 weight percent of the monolithic honeycomb catalyst bed.

The present invention also encompasses a reactor for the hydrotreating of hydrocarbon feedstocks. One illustrative embodiment of the reactor includes a reaction chamber having a feed inlet and a product outlet; and a monolithic honeycomb catalyst bed inside the reaction chamber. The monolithic honeycomb catalyst bed may be composed of one or more modules that are composed of a monolithic honeycomb refractory support and a hydrotreating catalyst component. It is preferred in one illustrative embodiment that the monolithic honeycomb catalyst bed has a channel density of about 25 to 1600 cells per square inch; a channel size from about 0.1 to 10 mm; and a channel wall thickness of about 0.01 to about 2.0 mm. The hydrodesulfurization catalyst components of one illustrative embodiment include a powdered refractory oxide and transition metal catalyst compounds. Alternatively these hydrodesulfurization catalyst components may be impregnated into the monolithic honeycomb catalyst bed itself. Preferable hydrodesulfurization catalyst components include a Group VIII metal containing compound and a Group VIB metal containing compound. Alternatively the hydrodesulfurization catalyst components may further include a phosphorous promoter. In one such illustrative embodiment, the Group VIII metal is preferably cobalt or nickel and the Group VIB metal is preferably tungsten or molybdenum. When the Group VIB metal is molybdenum, the molybdenum content of the hydrodesulfurization catalyst components measured as weight percent of $MoO_3$ is preferably from about 12 to about 18. Similarly when the Group VIII metal is cobalt, the cobalt content of the hydrodesulfurization catalyst components measured as weight percent of $Co_3O_4$ is preferably from about 2 to about 5. Irrespective of the method of formulating the monolithic honeycomb catalyst bed, the hydrodesulfurization catalyst components are preferably from about 1 weight percent to about 100 weight percent of the monolithic honeycomb catalyst bed.

While the apparatus, compositions, and methods of this invention have been described in terms of preferred and illustrative embodiments, it will be apparent to those of skill in the art that variations may be applied without departing from the concept and scope of the invention. All such similar substitutes and modifications apparent to those skilled in the art are deemed to be within the scope and concept of the invention.

What is claimed is:

1. A process for the hydrotreating of a hydrocarbon feed, the process comprising:

reacting a naptha hydrocarbon feed in vapor phase with a hydrogen containing gas in a reactor containing a monolithic honeycomb catalyst bed to give a hydrotreated hydrocarbon product;

wherein the monolithic honeycomb catalyst bed includes: a monolithic honeycomb refractory support and a hydrotreating catalyst; and wherein the hydrogen containing gas to hydrocarbon feed liquid volume ratio is greater than about 10 NL/L, the liquid hourly space velocity is greater than about 1 liter per liter per hour, the reactor pressure is greater than about 50 psig, and the monolithic honeycomb catalyst bed temperature is greater than about 150° C.

2. The process of claim 1, wherein the monolithic honeycomb catalyst bed has a channel density of about 25 to 1600 cells per square inch; a channel size from about 0.1 to 10 mm; and a channel wall thickness of about 0.01 to about 2.0 mm.

3. The process of claim 1, wherein the hydrotreating catalyst components include a powdered refractory oxide and transition metal catalyst compounds.

4. The process of claim 1, wherein the hydrotreating catalyst components are impregnated into the monolithic honeycomb refractory support.

5. The process of claim 1, wherein the hydrotreating catalyst components include a Group VIII metal containing compound and the Group VIB metal containing compound.

6. The process of claim 5 wherein the Group VIII metal is selected from the group of cobalt and nickel and the Group VIB metal is selected from the group of tungsten and molybdenum.

7. The method of claim 3, wherein the molybdenum content of the hydrotreating catalyst components measured as weight percent of MoO3 is from about 12 to about 18 and the cobalt content of the hydrotreating catalyst components measured as weight percent of Co3O4 is from about 2 to about 5.

8. The method of claim 3, wherein the hydrotreating catalyst components includes a phosphorous promoter, the phosphorous promoter content measured as weight percent of P2O4 and being from about 0.1 to about 2.

9. The method of claim 1, wherein the hydrotreating catalyst components are from about 1 weight percent to about 100 weight percent of the monolithic honeycomb catalyst bed.

10. A method of increasing the selective desulfurization of naphtha feed streams, the method comprising:

combining a naphtha feed stream with a hydrogen containing gas to form a combined feed stream;

reacting the combined feed stream over a monolithic honeycomb catalyst bed containing hydrodesulfurization catalyst components at a hydrogen containing gas to hydrocarbon feed liquid volume ratio greater than about 10 NL/L, a liquid hourly space velocity greater than about 1 liter per liter per hour, a reactor pressure greater than about 50 psig, and a monolithic honeycomb catalyst bed temperature greater than about 150° C. to give a desulfurized naphtha;

wherein the percent desulfurization is greater than about 50% and the percent olefin hydrogenation is less than about 50%.

11. The method of claim 10, wherein the monolithic honeycomb catalyst bed has a channel density of about 25 to 1600 cells per square inch; a channel size from about 0.1 to 10 mm; and a channel wall thickness of about 0.01 to about 2.0 mm.

12. The process of claim 10, wherein the octane number (R+M/2) of the naphtha feed stream is reduced by no more than 3.0.

13. The process of claim 10, wherein the hydrodesulfurization catalyst components include a powdered refractory oxide and transition metal catalyst compounds.

14. The process of claim 10, wherein the hydrodesulfurization catalyst components are impregnated into the monolithic honeycomb catalyst bed.

15. The process of claim 10, wherein the hydrodesulfurization catalyst components include a Group VIII metal containing compound and a Group VIB metal containing compound.

16. The process of claim 13 wherein the Group VIII metal is cobalt and the Group VIB metal is molybdenum.

17. The method of claim 16, wherein the hydrodesulfurization catalyst components includes a phosphorous promoter.

18. The method of claim 10 wherein the combined feed stream is reacted over the monolithic catalyst bed in the vapor phase at a hydrogen containing gas to hydrocarbon feed liquid volume ratio in the range of 50–300 NL/L, a liquid hourly space velocity in the range of about 2–50 liters per liter per hour, a reactor pressure in the range of about 150–1000 psig, and a monolithic honeycomb catalyst bed temperature in the range of about 250°–400° C.

19. A process for desulfurizing a hydrocarbon feed comprising the step of:

reacting a vaporized hydrocarbon feed comprising both sulfur and olefins with a hydrogen containing gas in a reactor containing a monolithic honeycomb catalyst bed comprising a monolithic honeycomb refractory support and a hydrotreating catalyst at a hydrogen containing gas to hydrocarbon feed liquid volume ratio greater than about 10 NL/L, a liquid hourly space velocity greater than about 1 liter per liter per hour, a reactor pressure greater than about 50 psig, and a monolithic honeycomb catalyst bed temperature greater than about 150° C.

* * * * *